United States Patent [19]

Coden et al.

[11] Patent Number: 5,019,301
[45] Date of Patent: May 28, 1991

[54] METHOD OF INJECTION MOLDING STAR-COUPLERS

[75] Inventors: Michael H. Coden, New York; Bulusu V. Dutt, Yorktown Heights, both of N.Y.

[73] Assignee: Codenoll Technology Corporation, Yonkers, N.Y.

[21] Appl. No.: 560,264

[22] Filed: Jul. 27, 1990

Related U.S. Application Data

[63] Continuation of Ser. No. 297,009, Jan. 12, 1989, abandoned.

[51] Int. Cl.⁵ .................. B29D 11/00; G02B 6/28
[52] U.S. Cl. .................. 264/1.5; 350/96.16
[58] Field of Search .................. 264/1.5; 350/96.16

[56] References Cited

U.S. PATENT DOCUMENTS

| | | | |
|---|---|---|---|
| 3,227,535 | 1/1966 | Woodcock | 65/4 |
| 3,498,864 | 3/1970 | Ogle | 264/1.5 |
| 4,008,061 | 2/1977 | Ramsay | 65/4 A |
| 4,039,607 | 8/1977 | Miller | 264/1.5 |
| 4,054,366 | 10/1977 | Barnoski et al. | 350/96.15 |
| 4,083,625 | 4/1978 | Hudson | 350/96.15 |
| 4,291,940 | 9/1981 | Kawasaki et al. | 350/96.15 |
| 4,362,357 | 12/1982 | Stockman et al. | 350/96.16 |
| 4,367,013 | 1/1983 | Guerder et al. | 350/96.34 |
| 4,384,038 | 5/1983 | Khoe et al. | 427/163 |
| 4,449,783 | 5/1984 | Witte | 350/96.16 |
| 4,484,794 | 11/1984 | Witte | 350/96.16 |
| 4,533,208 | 8/1985 | Stowe | 350/96.16 |
| 4,560,247 | 12/1985 | Aldebert | 350/96.30 |
| 4,566,753 | 1/1986 | Mannschke | 350/96.16 |
| 4,590,619 | 5/1986 | Winzer | 455/612 |
| 4,653,845 | 3/1987 | Tremblay et al. | 350/96.16 |
| 4,708,424 | 11/1987 | Marhic | 350/96.16 |

FOREIGN PATENT DOCUMENTS

| | | | |
|---|---|---|---|
| 0174014 | 12/1986 | European Pat. Off. | |
| 0219096 | 4/1987 | European Pat. Off. | |
| 2299656 | 8/1976 | France | 350/96.16 |
| 120004 | 9/1980 | Japan | 264/1.5 |
| 149008 | 9/1983 | Japan | 264/1.5 |
| 232312 | 12/1984 | Japan | 264/1.5 |
| 62-061012 | 3/1987 | Japan | |
| 57-197512 | 12/1987 | Japan | |

OTHER PUBLICATIONS

Barnoski et al., "Fabrication of an Access Coupler with Single-Strand Multimode Fiber Waveguides", *Applied Optics*, vol. 15, No. 11, Nov. 1976, pp. 2629-2630.

Casasent et al., "Adaptive Phorodichroic Matched Spatial Filter", *Applied Optics*, vol. 15, No. 11, Nov. 1976, p. 2631.

Ozeki et al., "Tapered Section of Multimode Cladded Fibers as Mode Filters and Mode Analyzers", *Appl. Phys. Ltrs.*, vol. 26, No. 7, Apr. 1, 1975, pp. 386-388.

Ozeki et al., "Optical Directional Coupler Using Tapered Sections in Multimode Fibers", *Appl. Phys Ltrs.*, vol. 28, No. 9, May 1, 1976, pp. 528-529.

Yamamoto et al., "A Large-Tolerant Single-Mode Optical Fiber Coupler with a Tapered Structure", *Proc. of IEEE*, Jun. 1976, pp. 1013-1014.

*Primary Examiner*—James Lowe
*Attorney, Agent, or Firm*—Pennie & Edmonds

[57] ABSTRACT

A star-coupler and a method for constructing the star-coupler employing injection molding technology are disclosed. The star-coupler may be constructed from a single injection molded block or a plurality of mating sections, and is supplied with a plurality of input ports and a plurality of output ports. Each input port as well as each output port is connected to at least one channel. The channels are filled with a fiber optical core material and the single block or mating sections are fabricated from fiber optical core material. Alternatively, a separate cladding material may be coated on the surfaces of the block or mating sections which define the channels. Optical signals are guided and confined by the core and cladding material from input ports to output ports along the channels.

7 Claims, 3 Drawing Sheets

METHOD OF INJECTION MOLDING STAR-COUPLERS

This is a continuation of application Ser. No. 07/297,009 filed Jan. 12, 1989 now abandoned.

BACKGROUND OF THE INVENTION

The present invention is directed to star-couplers in which a plurality of optical fibers are connected together. The invention is also directed to methods for making the couplers.

Data transmission over optical fibers offers many significant advantages compared with metallic conductors, including: long distance transmission without the need for repeaters, immunity from electromagnetic interference, cross-talk and ground loop, high bandwidth capabilities, small size and weight, high degree of intercept security and dielectric isolation, and long term cost reduction. These desirable features of optical fibers have strongly stimulated efforts both in fiber optics and in supporting technologies such as fiber optic coupling.

Fiber optic couplers provide for feeding and tapping of optical energy. Fiber optic couplers are widely used in multi-terminal communication systems and data buses. In these applications, a common optical path provides communication among a plurality of terminals. Typically, each terminal communicates to every other terminal and provides information on a time shared basis. The effectiveness of such systems depends on characteristics of the optical fibers themselves as well as on the coupling devices employed to share and distribute information.

A star-coupler is a device which distributes the power on any one of several incoming channels to every one of its outgoing channels. Star-couplers are intended to have minimal insertion losses and a substantially uniform power distribution over the outgoing channels. Thus, a system employing a star-coupler and a plurality of terminals represents a parallel distribution system.

Star couplers are particularly useful in the field of optical communications for coupling together a plurality of optic fibers to form a network. Several different starcouplers are known. In general, the couplers have a plurality of incoming channels, a plurality of outgoing channels and a mixing zone which couples optical signals from any one of the incoming channels to all of the outgoing channels. The mixing zone may comprise optic fibers which are tapered and fused together or wave guides in solid blocks of glass. These glass blocks usually have wave guides specially prepared by ion exchange processes or otherwise, and the fibers are aligned with the wave guides. The incoming and outgoing channels are typically bundles of optical fibers. Information in the form of light pulses as signals from any single optical fiber of the input fiber optic bundle is transmitted via the coupler to each of the optical fibers in the output fiber optic bundle. Illustrative patents describing these structures include U.S. Pat. Nos. 4,291,940, 4,362,357, 4,449,783, 4,484,794, 4,590,619 and 4,653,845.

Unfortunately, the above-mentioned type of starcouplers are generally costly and difficult to construct.

SUMMARY OF THE INVENTION

We have devised a star-coupler that is made by injection molding techniques using optical plastics such as those used in optical fiber technology. In accordance with our invention, the coupler comprises a block of plastic or other suitable material that is injection molded to form input and output connectors and a mixing zone. The block is made of a core and an outer cladding. The core is made of a material having an index of refraction that is higher than that of the cladding. Advantageously, the core is made of pure polymethylmethacrylate (PMMA) and the cladding is made of fluorinated PMMA. Because the coupler is made by molding techniques, fabrication costs are relatively low compared to those of conventional star-couplers.

The input and output connectors are defined in the injection molding process to have a shape which facilitates their connection to conventional optic fibers and connectors. As a result, the star-coupler can readily be connected to the fibers which it is to couple.

The coupler is injection molded following any one of a number of techniques. For example, the coupler can be formed by injection molding a bottom half and a top half with a material that has a refractive index similar to that of the cladding. Channels are defined in the bottom and/or top halves for receiving the core material, the two halves are fitted together with the channels forming a cavity therebetween and then the core material is injection molded into the cavity defined between the cladding halves.

BRIEF DESCRIPTION OF THE DRAWINGS

These and other objects, features and advantages of the invention will become more readily apparent from the following detailed description of a preferred embodiment of the invention in which.

DETAILED DESCRIPTION OF THE INVENTION

Figure 1:
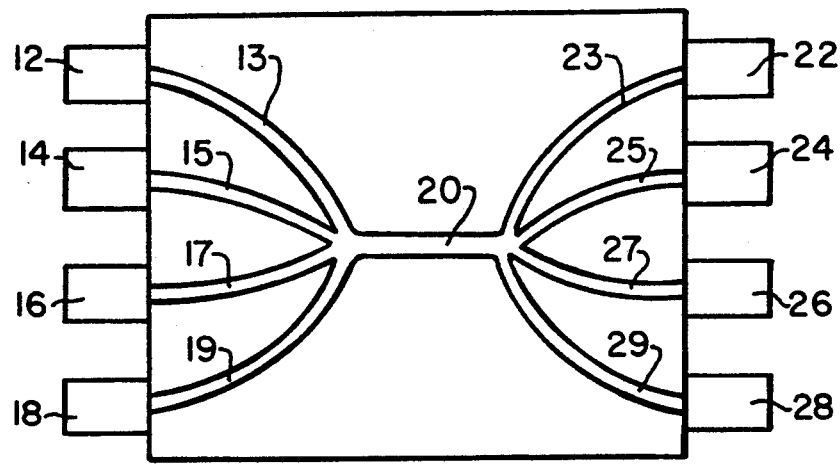
FIG. 1 is a schematic illustration of a 4×4 star-coupler of the present invention.

As shown schematically in FIG. 1, an illustrative embodiment of the invention comprises four input ports 12, 14, 16, 18, a mixing channel or zone 20 and four output ports 22, 24, 26, 28. Input ports 12, 14, 16, 18 are connected to mixing zone 20 by channels 13, 15, 17, 19, respectively. Mixing zone 20 is connected to ports 22, 24, 26, 28 by channels 23, 25, 27, 29, respectively.

These channels and the mixing zone propagate optical signals. Thus, light input to any of the input ports will be transmitted to mixing element 20 where it is then distributed to all of the output ports. For example, light input at input port 12 is transmitted by channel 13 to mixing zone 20. Mixing zone 20 then distributes the light from port 12 to each of output ports 22, 24, 26, 28 along channels 23, 25, 27, 29, respectively. Illustratively, ports 12, 22 are corresponding input and output ports, i.e., they are each connected to the same terminal or data communications device. Similarly, ports 14, 24, ports, 16, 26 and ports 18, 28 are each connected to the same device. In FIG. 1, as in all of the figures, the channels are schematically depicted and are not drawn to scale.

Figure 2:
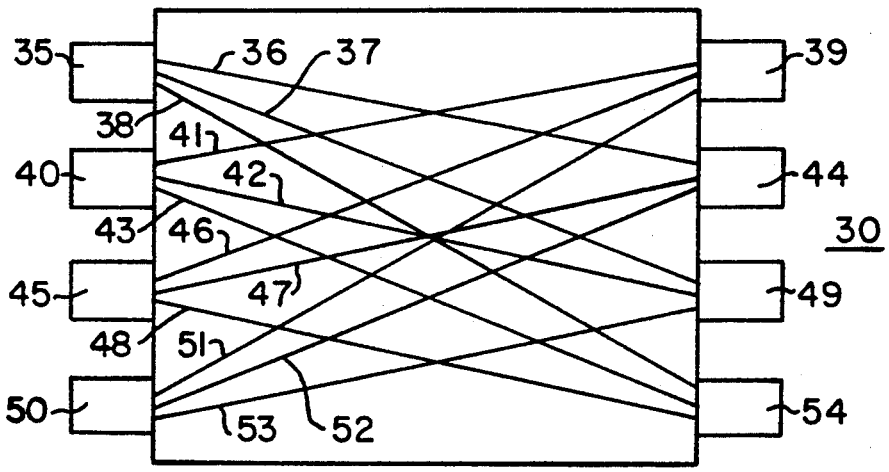
FIG. 2 is a schematic illustration of a second embodiment of a 4×4 star-coupler of the present invention.

Referring now to FIG. 2, there is schematically depicted a further embodiment of a 4×4 star-coupler. This particular embodiment comprises input ports 35, 40, 45, 50 and output ports 39, 44, 49, 54 which are located opposite ports 35, 40, 45, 50, respectively. Input port 35 and output port 39 are preferably connected to the same terminal or device. Similarly, ports 40, 44, ports 45, 49 and ports 50, 54 are each connected to the same terminal or device. Each of the input ports is provided with a separate channel to each of the output ports, except the corresponding output port connected to the same device, illustratively, the output port directly opposite that input port. For example, input port 35 is provided with channel 36 to output port 44, channel 37 to output port 49 and channel 38 to output port 54. In this embodiment, input port 35 is not provided with a channel to its opposite corresponding output port, namely, port 39.

Advantageously, such a configuration wherein a star-coupler's input and output ports are not coupled to each other eliminates the echo encountered in conventional passive star-couplers.

Figure 3:
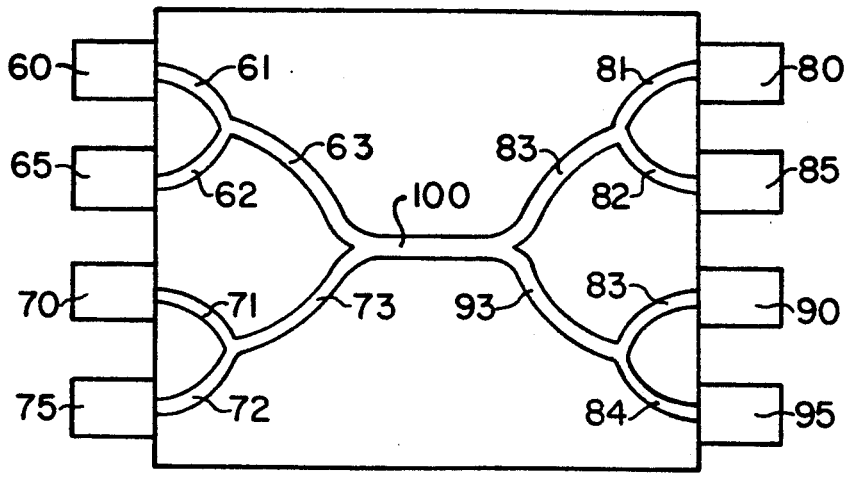
FIG. 3 is a schematic illustration of a third embodiment of a 4×4 star-coupler of the present invention.

FIG. 3 is a schematic illustration of another embodiment of the invention comprising input ports 60, 65, 70, 75 and output ports 80, 85, 90, 95. As in the embodiment of FIG. 1, light from any input port is provided to all of the output ports. In this embodiment, a binary tree network connects all input ports to a mixing channel and a second binary tree network connects the mixing channel to all output ports. Specifically, light from input port 60 enters channel 61, then channel 63 and then channel 100. From channel 100, the light is distributed to channels 83 and 93. From channel 83, the light is distributed to channels 81, 82 which are coupled to ports 80, 85, respectively. Similarly, from channel 93, the light is distributed to channels 91, 92 which are coupled to ports 90, 95, respectively. Light input to any of input ports 65, 70, 75 is similarly provided to all of the output ports 80, 85, 90, 95.

Figure 4:
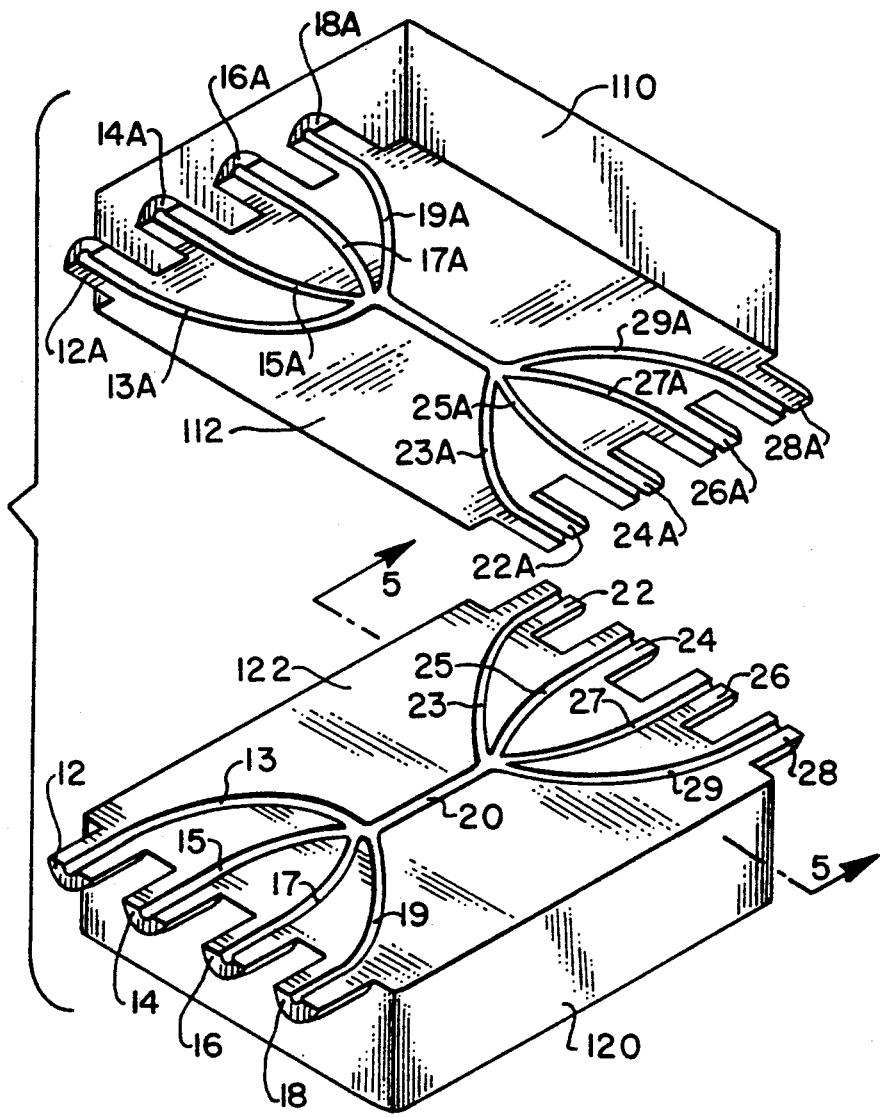
FIG. 4 is a perspective view of the top and bottom halves of the cladding of the injection molded coupler of FIG. 1.

Referring now to FIG. 4, there is depicted a perspective view of the device schematically illustrated in FIG. 1. This 4×4 star-coupler comprises a first section 110 and a mating second section 120. Illustratively, these sections are mirror images of each other and each forms one half of the star-coupler.

Each of sections 110 and 120 is preferably fabricated by injection molding and comprises a block-like structure having a planar face 112, 122, respectively. A network of channels, preferably semicircular in shape, is formed in each of these faces 112, 122. The configuration of this network has been described in conjunction with FIG. 1.

Attachment of section 110 to section 120 thus provides a network of circular channels in which each input port is connected to all of the output ports. Each input port and each output port is formed by two port portions, for example 12 and 12A.

Advantageously, sections 110, 120 are each constructed from a suitable plastic optic cladding material. Further, the entire network of channels is filled with a suitable fiber optic core material prior to attachment of section 110 to section 120. Application of force (by means not shown) to the sections will cause excess core material to be expelled from between the sections. Alternatively, sections 110, 120 may first be joined together and then core material injected into the ports to entirely fill the channels. The cladding material has a lower index of refraction than the core material. Thus, light is propagated in the core material and guided and confined therein by the cladding material.

A suitable material for the cladding is fluorinated polymethylmethacrylate (PMMA) while a suitable material for the core is pure PMMA.

Advantageously, the input and output ports are formed during injection molding and are appropriately aligned with respect to the channel(s) to which they are attached. These ports are adapted to be easily connected to known connectors and preferably do not require further machining. The particular shape and configuration of the ports depend on the nature of the connector to which it is to be connected.

Figure 5:
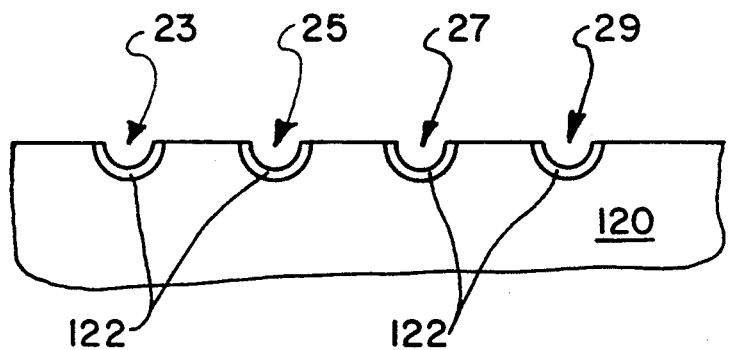
FIG. 5 is a modified cross-sectional view along line 5—5 of FIG. 4.

In an alternative embodiment from that of FIG. 4, sections 110, 120 are constructed from practically any material which can be injection molded. FIG. 5 illustrates such an embodiment in the form of a modified cross-sectional view of FIG. 4. In this embodiment, a suitable cladding material 122 is applied to the surfaces of section 120 defining channels 23, 25, 27, 29 therein. Core material is then placed within the channels as discussed in conjunction with the description of FIG. 4.

Figure 6:
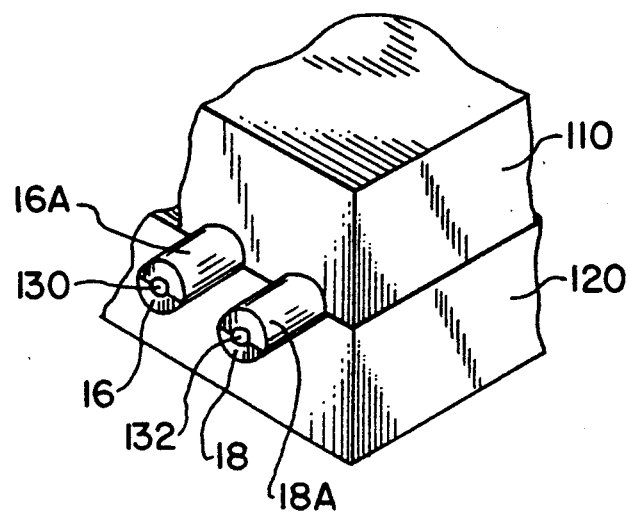
FIG. 6 is a perspective view of a portion of the injection molded coupler of FIG. 1.

FIG. 6 illustrates a portion of a star-coupler assembled in accordance with the invention. Specifically, a first input port comprises halves 16, 16A and core 130 while a second input port comprises halves 18, 18A and core 132.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the spirit and scope of the present invention.

Specifically, a one-piece structure having a suitable network of channels can be formed by injection molding. Furthermore, the two mating halves which form a star-coupler need not be mirror images of each other, for example, one may contain a channel of more than half of the cross-sectional area of the resultant channel and the other may contain less than half of the cross-sectional area or none of the resultant channel. The channel may be non-circular. For example, for ease of molding operation, the channel can be a rectangular or square-walled channel with a slight taper for mold release and so on. Moreover, the invention is not limited to the disclosed 4×4 star-couplers, but may be practiced with star-couplers having any practical number of ports. Additionally, injection molded fiber optic connectors may be provided to simply connect together two optical fibers and not interconnect various ports and channels as in a conventional star-coupler.

What is claimed is:

1. A method for constructing a star-coupler comprising the steps of:

forming by injection molding a first section and a second section each having a plurality of channels therein including a mixing zone, a plurality of input connector portions and a plurality of output connector portions, each of said input and output connector portions being adapted for connection to a mating fiber optic connector, being connected to at least one of said channels, and being integral with the section in which it is molded; and said channels, input connector portions and output connector portions of said second section being configured so as to align and mate with said channels, input connector portions and output connector portions of said first section;

filling said plurality of channels in each of said first and second sections with a core material for transmitting optical signals; and fastening said first section to said second section so as to align said channels and said connector portions of said first section with said channels and said connector portions of said second section, thus forming a corresponding plurality of channels and connectors, wherein said step of filling may occur prior or subsequent to said step of fastening.

2. The method of claim 1 further comprising disposing a fiber optic cladding material on said channels before said step of filling said channels with said core material so as to form a cladding structure having a circular cross section surrounding said core material, thereby confining and guiding optical signals transmitted within said core material.

3. The method of claim 1 wherein said filling step comprises injecting said core material into said channels of said star-coupler after said step of fastening.

4. The method of claim 1 wherein said filling step comprises placing said core material in said plurality of channels in said first section and separately placing said core material in said plurality of channels in said second section before said step of fastening.

5. A method for constructing a star-coupler comprising the steps of:

forming by injection molding a block having a plurality of channels therein, a plurality of input connectors and a plurality of output connectors, each of said input and output connectors having located therein at least one channel of said plurality of channels, said plurality of input connectors and said plurality of output connectors being integrally formed with said block and said plurality of channels, and filling said plurality of channels in said block with a core material for transmitting optical signals.

6. The method of claim 5 further comprising disposing a fiber optic cladding material on surfaces of said block defining said channels before said step of filling said channels with said core material so as to form a cladding structure surrounding said core material, thereby confining and guiding optical signals transmitted within said core material.

7. The method of claim 5 wherein said step of filling comprises injecting said core material into said channels of said star-coupler.

* * * * *